(12) United States Patent
Roskind

(10) Patent No.: US 10,244,073 B2
(45) Date of Patent: *Mar. 26, 2019

(54) ADAPTIVE DNS PRE-RESOLUTION

(71) Applicant: Google LLC, Mountain View, CA (US)

(72) Inventor: James Roskind, Redwood City, CA (US)

(73) Assignee: Google LLC, Mountain View, CA (US)

( * ) Notice: Subject to any disclaimer, the term of this patent is extended or adjusted under 35 U.S.C. 154(b) by 293 days.

This patent is subject to a terminal disclaimer.

(21) Appl. No.: 14/948,855

(22) Filed: Nov. 23, 2015

(65) Prior Publication Data

US 2016/0182674 A1  Jun. 23, 2016

Related U.S. Application Data

(63) Continuation of application No. 12/415,471, filed on Mar. 31, 2009, now Pat. No. 9,225,794.

(51) Int. Cl.
*G06F 15/173* (2006.01)
*H04L 29/08* (2006.01)
(Continued)

(52) U.S. Cl.
CPC .... *H04L 67/2847* (2013.01); *G06F 17/30861* (2013.01); *H04L 61/10* (2013.01);
(Continued)

(58) Field of Classification Search
CPC ............. H04L 67/2847; H04L 29/0881; H04L 61/1511; H04L 29/12066; G06F 12/0862
(Continued)

(56) References Cited

U.S. PATENT DOCUMENTS 6,067,565 A * 5/2000 Horvitz ............. G06F 17/30861
707/E17.107
6,385,641 B1 * 5/2002 Jiang ....................... H04L 29/06
709/203

(Continued)

OTHER PUBLICATIONS

Nidd, T., et al., "Prefetching DNS Lookup for Efficient Wireless WWW Browsing," Proceedings of Wireless 97, the 9th Annual International Conference on Wireless Communications, Calgary, Alberta, Canada, pp. 409-414, Jul. 1997 (Year: 1997).*

(Continued)

*Primary Examiner* — Taylor A Elfervig
(74) *Attorney, Agent, or Firm* — Lerner, David, Littenberg, Krumholz & Mentlik, LLP

(57) ABSTRACT

Embodiments of the present invention include methods and systems for domain name system (DNS) pre-resolution. A method for DNS pre-resolution is provided. The method includes initiating a DNS lookup call for one or more sub-resource uniform resource locator (URL) hostnames associated with a referring URL prior to navigation to the referring URL, whereby a resolution result for at least one of the sub-resource URL hostnames is cached in a DNS cache in preparation for navigation to the sub-resource URLs. The method further includes learning relationship information including the sub-resource URLs associated with the referring URL for DNS pre-resolution. A system for DNS pre-resolution is also provided. The system includes a DNS pre-resolver, a navigation monitor and a relationship data store.

20 Claims, 4 Drawing Sheets

(51) Int. Cl.
*H04L 29/12* (2006.01)
*G06F 17/30* (2006.01)
*G06F 12/0862* (2016.01)

(52) U.S. Cl.
CPC ...... *H04L 61/1511* (2013.01); *H04L 61/6009* (2013.01); *H04L 67/2842* (2013.01); *G06F 12/0862* (2013.01); *H04L 29/0881* (2013.01); *H04L 29/12066* (2013.01)

(58) Field of Classification Search
USPC .......................................................... 709/223
See application file for complete search history.

(56) References Cited

U.S. PATENT DOCUMENTS

| | | | | |
|---|---|---|---|---|
| 6,993,591 | B1* | 1/2006 | Klemm | H04L 67/2847 707/999.002 |
| 7,356,534 | B2 | 4/2008 | Mohammed et al. | |
| 7,747,749 | B1* | 6/2010 | Erikson | G06F 17/30902 709/219 |
| 7,975,025 | B1* | 7/2011 | Szabo | G06F 17/30902 709/203 |
| 8,280,946 | B1* | 10/2012 | Badros | H04L 61/1511 709/203 |
| 2005/0154781 | A1* | 7/2005 | Carlson | G06F 17/30902 709/203 |
| 2006/0294223 | A1* | 12/2006 | Glasgow | H04L 67/2847 709/224 |
| 2008/0177894 | A1* | 7/2008 | Jennings | H04L 29/12066 709/232 |
| 2008/0229024 | A1* | 9/2008 | Plamondon | H04L 67/28 711/126 |
| 2009/0222584 | A1* | 9/2009 | Josefsberg | H04L 29/12066 709/245 |
| 2010/0114822 | A1* | 5/2010 | Pollock | H04L 67/36 707/623 |
| 2010/0146415 | A1* | 6/2010 | Lepeska | G06F 17/30 715/760 |
| 2010/0154055 | A1* | 6/2010 | Hansen | G06F 21/6218 726/22 |
| 2012/0066576 | A1* | 3/2012 | Zhu | G06F 17/30864 715/206 |

OTHER PUBLICATIONS

Srinivas Krishnan and Fabian Monrose. 2010. DNS prefetching and its privacy implications: when good things go bad. In Proceedings of the 3rd USENIX conference on Large-scale exploits and emergent threats: botnets, spyware, worms, and more (LEET'10). USENIX Association, Berkeley, CA, USA, 10-10. (Year: 20.*

Hao Shang and Craig E. Wills. 2006. Piggybacking related domain names to improve DNS performance.Comput. Netw. 50, 11 (Aug. 2006), 1733-1748 (Year: 2006).*

E. Cohen and H. Kaplan, "Proactive caching of DNS records: addressing a performance bottleneck,"Proceedings 2001 Symposium on Applications and the Internet, San Diego, CA, USA, 2001, pp. 85-94. (Year: 2001).*

Bou Ras, C., et al., "Predictive Prefetching on the Web and its Potential Impact in the Wide Area," World Wide Web: Internet and Web Information Systems, 2004, vol. 7, pp. 143-179; Kluwer Academic Publishers, The Netherlands.

Cohen et al., "Prefetching the Means for Document Transfer: A New Approach for Reducing Web Latency", IEEE INFOCOM 2000, 2000, pp. 854-863.

de la Ossa, B. ; Gil?J. A.; Sahuquillo?J.; Pont?A .?"Improving Web Prefetching by Making Predictions at Prefetch?" Next Generation Internet Networks?3rd EuroNGI Conference on?vol., No.?pp. 21 ?27? May 21-23, 2007.

Eden,A. N.; Joh?B .W.; Mudge?T. ?"Web latency reduction via client-side prefetching" Performance Analysis of Systems and Software? 2000. ISPASS. 2000 IEEE International Symposium on?vol., No.? pp. 193?200?2000.

Edith Cohen et al., "Prefetching the Means for Document Transfer: A New Approach for Reducing Web Latency," Computer Networks, vol. 39, No. 4,Jul. 15, 2002, pp. 437-455.

International Search Report and the Written Opinion of the International Searching Authority for Application No. PCT/US2009/054906 dated Dec. 8, 2009.

International Search Report and the Written Opinion of the International Searching Authority for Application No. PCT/US2009/0553758 dated Nov. 26, 2009.

Klemm, "WebCompanion: A Friendly Client-Side Web Prefetching Agent", IEEE Transactions on Knowledge and Data Engineering vol. 11, No. 4, Jul./Aug. 1999, pp. 577-594.

Nagino, N .; Yamada?S .?"Future view: Webn avigation based on learning user's browsing patterns," Web Intelligence?2003. WI 2003. Proceedings. IEEE/WIC International Conference on, vol., No.?pp. 541-544? Oct. 13-17, 2003.

Office Communication, dated Apr. 12, 2011, for U.S. Appl. No. 12/197,907, filed Aug. 25, 2008, 3 pages.

Office Communication, dated Aug. 25, 2011, for U.S. Appl. No. 12/197,907, filed Aug. 25, 2008, 24 pages.

Office Communication, dated Dec. 21, 2010, for U.S. Appl. No. 12/197,907, filed Aug. 25, 2008, 32 pages.

Office Communication, dated Jan. 19, 2010, for U.S. Appl. No. 12/197,907, filed Aug. 25, 2008, 19 pages.

Office Communication, dated Jul. 8, 2010, for U.S. Appl. No. 12/197,907, filed Aug. 25, 2008, 19 pages.

Office Communication, dated May 10, 2010, for U.S. Appl. No. 12/201,979, filed Aug. 29, 2008, 22 pages.

Office Communication, dated Nov. 12, 2010, for U.S. Appl. No. 12/201,979, filed Aug. 29, 2008, 25 pages.

Office Communication, dated Nov. 18, 2009, for U.S. Appl. No. 12/201,979, filed Aug. 29,2008, 14 pages.

Wang, et al., "Prefetching in World Wide Web", IEEE, 1996, pp. 28-32.

* cited by examiner

ADAPTIVE DNS PRE-RESOLUTION

BACKGROUND

Field of the Invention

Embodiments of the present invention relate to applications and the World Wide Web.

Background Art

A web browser is a software application that allows a user to view or download content that is available on a network, such as on a website on the World Wide Web. Content may include text, files, images, audio, video and personal communications. A browser may also allow a user to enter, upload, or execute content. Browsers run on personal computers and mobile devices. Commonly used browsers may presently include, for example, CHROME, FIREFOX, INTERNET EXPLORER, SAFARI, and OPERA.

Browsers may use a number of protocols and standards to obtain or manage content flow. Most browsers primarily use hypertext transfer protocol (HTTP) to fetch content and web pages. Web pages are located using a uniform resource locator (URL), which identifies where the web page may be found. Web pages may be retrieved using the Internet Protocol (IP) address of the computer holding the web page content. In order to be more memorable and human friendly, an IP address or hierarchy may be represented by a hostname (such as www.google.com). A hostname is a domain name that has one or more associated IP addresses. A user may navigate to a web page using a URL hostname. For example, a user may perform a hostname request. A hostname request may include a user clicking on a link on a web page or typing a hostname in a URL bar. Hostnames and other information associated with domain names may be resolved or translated to IP addresses using the Domain Name System (DNS). This DNS resolution system is sometimes referred to as the "phone book" for the Internet.

DNS resolution requires either looking in a local computer cache or querying a set of DNS servers over the network. A request for DNS resolution may also be known as a DNS lookup call. DNS utilizes authoritative name servers to help map domain names to IP addresses in order to avoid having all the information in a single, central DNS server. These and other intermediate name servers may cache DNS resolution information to shorten DNS resolution times.

For example, FIG. 1 illustrates an exemplary system 100 that performs DNS resolution. When network traffic is required, User Datagram Protocol (UDP) packets are sent to a DNS resolver, and eventually a UDP response is provided. DNS resolutions may exist in a local cache, such as DNS cache 110. DNS cache 110 may be an operating system DNS cache. DNS cache 110 may also be a cache in a browser. If a resolution is not in a local cache, the next resolver is commonly Local Area Network (LAN) firewall 120. If a resolution is not cached in LAN firewall 120, resolution may necessitate traffic from the firewall resolver to another resolver, such as Internet Service Provider (ISP) 140, over network 130. The latency time of two such round trips may commonly be no less than 40 ms compared to 0-3 ms when local DNS cache 110 is the source of the resolution. If resolution information is not in the cache of firewall 120 or ISP 140, other intermediate servers 160 may be queried over one or more networks 150. If the hostname is yet to be resolved, authoritative server 170 or main DNS server 180 will be queried and latency to acquire a resolution will be further increased. Failures, delays and lost packets contribute to accumulated latency that can commonly exceed 1 second or longer. Longer latency times cause discomfort to users of a web browser.

DNS resolution times can be reduced. When DNS resolution occurs for a website, cached results will make future visits to a website quicker. For instance, a web page when first visited may have a portion of its presentation latency attributable to DNS resolution, which could exceed 120 milliseconds. Future visits to the same sites while a local cache retains the resolution will resolve DNS queries from cache at no significant latency cost.

User-perceived latency may be reduced through DNS pre-fetching. DNS pre-fetching resolves or fetches a variety of hostnames through the DNS in advance of their absolute necessity, anticipating that one of those name resolutions will probably be useful in an upcoming user web page or hostname request. However, when a web page is visited, additional sub-resources often need to be obtained. These sub-resources may be provided by additional domains which need to be resolved by the DNS system. For example, when a web page is visited, additional sub-resources such as a content server domain, an image server domain, an ad server domain, and a news server domain need to be resolved. These additional resolutions can have an undesirable effect on latency.

BRIEF SUMMARY

Embodiments described herein refer to systems and methods for domain name system (DNS) pre-resolution. According to an embodiment, a method for DNS pre-resolution is provided. The method may be performed in a processor executing a browser that utilizes a DNS to resolve network addresses. The method includes initiating a DNS lookup call for one or more sub-resource uniform resource locator (URL) hostnames associated with a referring URL prior to navigation to the referring URL, whereby a resolution result for at least one of the sub-resource URL hostnames may be cached in a DNS cache in preparation for navigation to the sub-resource URLs.

A further embodiment includes identifying relationship information including one or more URL sub-resource hostnames associated with the referring URL or URL hostname for DNS pre-resolution. An embodiment may also include detecting relationship information based upon one or more sub-resource URLs loaded as a consequence of obtaining content of the referring URL. Another embodiment may include receiving relationship information for DNS pre-resolution.

According to another embodiment, a system for DNS pre-resolution is provided. The system includes a browser that utilizes a DNS to resolve network addresses. The system also includes a DNS pre-resolver configured to initiate a DNS lookup call for one or more sub-resource URLs associated with a referring URL prior to navigation to the referring URL, whereby a DNS resolution result for at least one of the sub-resource URL hostnames may be cached in the DNS cache in preparation for navigation to the sub-resource URLs.

According to a further embodiment, the system may include a navigation monitor configured to identify relationship information including one or more sub-resource URLs associated with the referring URL for DNS pre-resolution. In another embodiment, the DNS pre-resolver is further configured to receive relationship information for DNS pre-resolution.

Further embodiments, features, and advantages of the invention, as well as the structure and operation of the various embodiments of the invention are described in detail below with reference to accompanying drawings.

BRIEF DESCRIPTION OF THE FIGURES

Embodiments of the invention are described with reference to the accompanying drawings. In the drawings, like reference numbers may indicate identical or functionally similar elements. The drawing in which an element first appears is generally indicated by the left-most digit in the corresponding reference number.

DETAILED DESCRIPTION OF THE INVENTION

Figure 1:
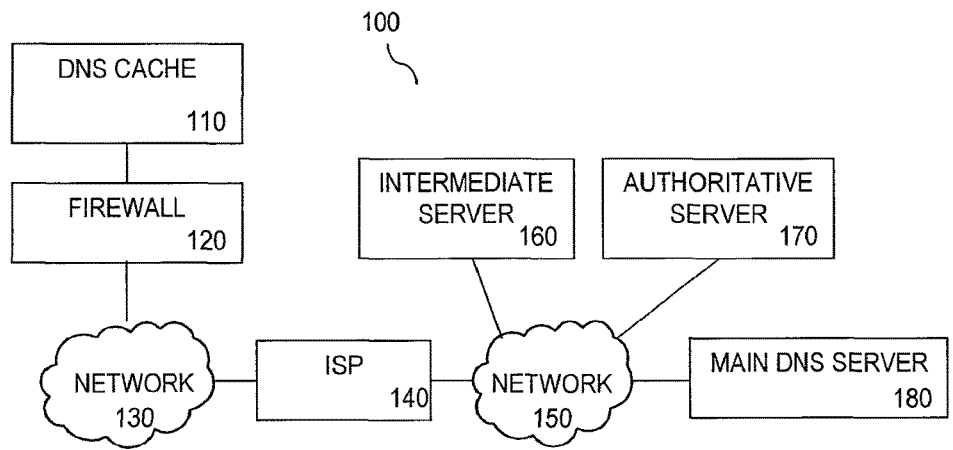
FIG. 1 is a diagram showing an existing system for DNS hostname resolution.

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

Overview

The goal of Domain Name System (DNS) pre-resolution is to reduce user-perceived latency when navigating the Internet. DNS pre-resolution uses DNS pre-fetching. DNS pre-fetching involves "pre-warming up" an existing DNS cache. A cache is considered "warm" if it happens to contain a subset of data that later proves useful. A DNS pre-fetch is a DNS lookup call to resolve an IP address for a hostname in which the resolved IP address is not actually used to render a web page for the IP address. In fact, results of such lookups may be discarded, or deleted, in some implementations. Instead, the act of calling a DNS query function, which is often passed to the operating system, causes IP resolutions to be stored in a DNS lookup system's cache. This is "pre-caching". Later, before a DNS cache expires, a thread can fetch the resource (e.g., URL) and the underlying cache will cause that fetch to be expedited. As a result, there will be reduced or little latency delay in obtaining a DNS resolution since it is already in a cache. This leads to dramatic savings in later URL navigation and avoids the complexity of interacting with the traditional network stack.

DNS pre-resolution uses DNS pre-fetching in order to pre-cache DNS resolutions of a referring Uniform Resource Locator (URL) hostname and/or its associated sub-resource URL hostnames. Sub-resource URLs may include domains, hostnames, hostnames plus paths, URLs or other sources of content. A URL may be described as a referring URL when the URL, upon request, proves to contain content that refers to the sub-resources. Similarly, a hostname may be described as a referring hostname when the hostname is in a referring URL, which when requested, proves to contain content that refers to the sub-resources.

It is often difficult to predict what sub-resources will be required upon requesting a referring URL. According to a feature, DNS pre-resolution may involve learning which sub-resource hostnames of a referring URL will need to be DNS pre-fetched. According to an embodiment, these sub-resource hostnames may be learned by identification in previous navigations, such as by identification in content eventually required when navigating to a referring URL. According to another embodiment, relationship information about sub-resource hostnames of a referring URL may be received. In some cases, some sub-resource hostnames may be removed from DNS pre-resolution consideration. This removal may include pruning stored relationships to include fewer hostnames, such as by discarding relationships that have not resulted in recent benefits. Further details of sub-resource learning are provided further below.

DNS Pre-Resolution

Figure 2:
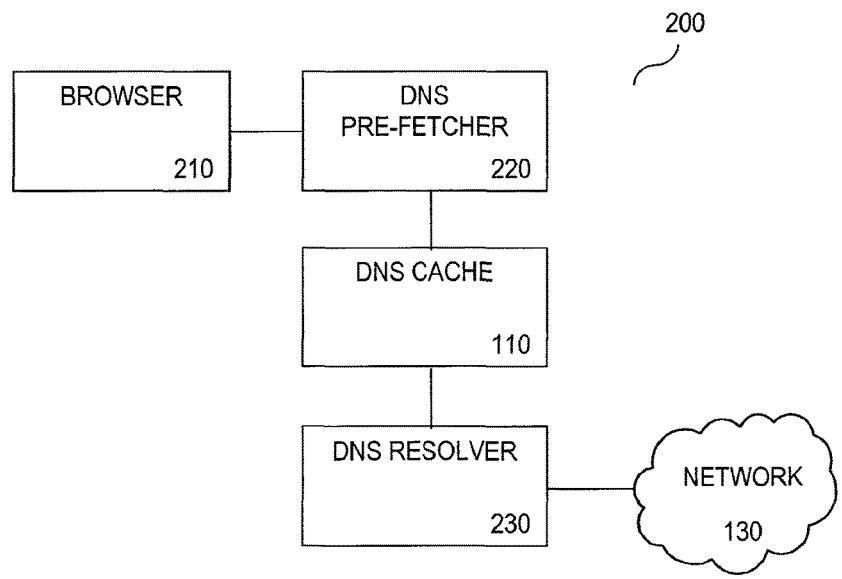
FIG. 2 is a diagram of a system for DNS pre-caching, according to an embodiment of the present invention.

FIG. 2 illustrates an exemplary system 200 for DNS pre-caching, according to an embodiment. System 200 includes browser 210, DNS pre-fetcher 220, DNS cache 110 and DNS resolver 230. These components may be coupled directly or indirectly, such as over a network. DNS resolver 230 may be coupled to one or more networks 130. According to an embodiment, browser 210 may include any device, application or module that enables a user or computer to navigate and/or retrieve data from another data source, typically over a network. Browser 210 may include any conventional browser including but not limited to for example, FIREFOX available from Mozilla Foundation Inc., INTERNET EXPLORER available from Microsoft Corp., SAFARI available from Apple Computer, Inc., and OPERA available from Opera Software ASA. Browser 210 may also be a multi-process browser such as CHROME available from Google Inc. According to a further embodiment, browser 210 may also be configured to use any number of protocols, including protocols such as HTTP, FTP, and underlying protocols such as TCP/IP or UDP.

Browser 210 may exist within or be executed by hardware in a computing device. For example, browser 210 may be software, firmware, or hardware or any combination thereof in a computing device. A computing device can be any type of computing device having one or more processors. For example, a computing device can be a workstation, mobile device (e.g., a mobile phone, personal digital assistant, or laptop), computer, game console, set-top box, kiosk, embedded system or other device having at least one processor and memory.

According to an embodiment, browser 210 may be configured to initiate a DNS lookup call for a referring URL hostname or domain and/or a sub-resource URL hostname or domain for DNS resolution. Browser 210 may initiate a DNS lookup call using DNS pre-fetcher 220. Many operating systems provide DNS resolution service asynchronously. That is, rather than calling a function and "waiting" until it returns, a function may be called and it will "call back" when it has an answer. As a result, a DNS resolver can be called with many requests (while prior requests are still pending). DNS pre-fetcher 220 may act in a similar asynchronous fashion, according to an embodiment. Also, DNS pre-fetcher 220 may act as a module separate from the network stack for DNS resolution.

If DNS resolutions are not cached in local DNS cache 110, hostnames may be provided to DNS resolver 230. DNS resolver 230 may require further queries over one or more networks 130 to resolve the hostnames provided by DNS pre-fetcher 220.

Figure 3:
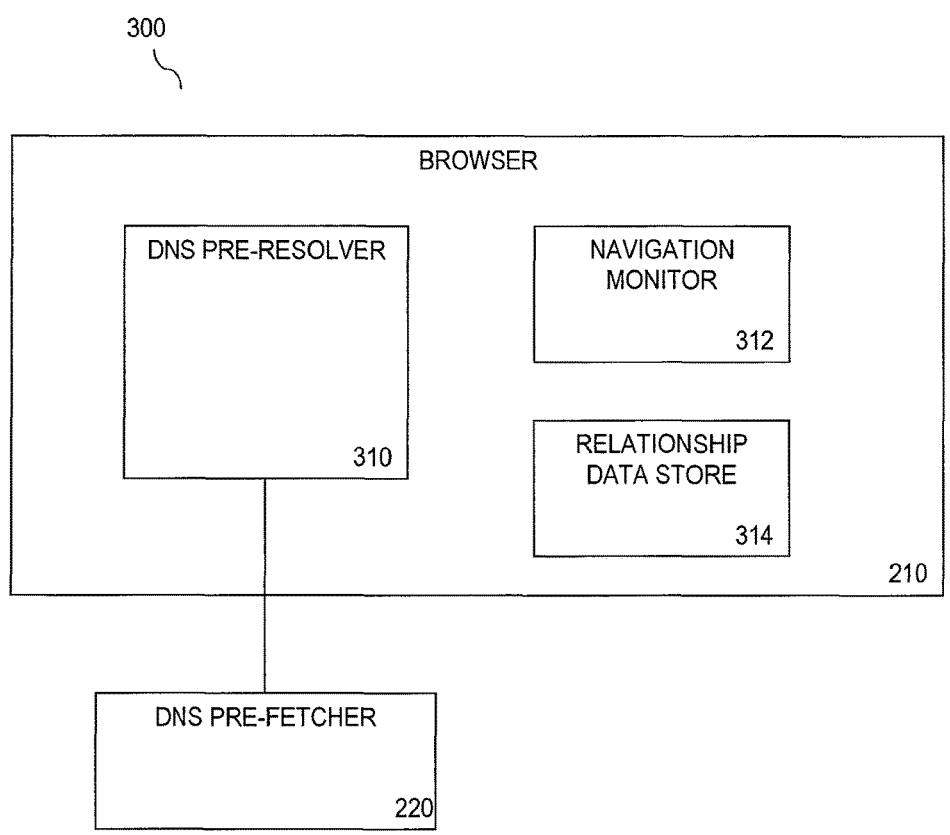
FIG. 3 is a more detailed diagram of a system for DNS pre-resolution, according to an embodiment of the present invention.

FIG. 3 illustrates an exemplary system 300 for DNS pre-resolution, according to an embodiment. System 300 includes browser 210, DNS pre-fetcher 220 and DNS pre-resolver 310. System 300 may include navigation monitor 312. System 300 may also include relationship data store 314, which may or may not be located in browser 210. These components may be coupled together directly or indirectly.

According to an embodiment, DNS pre-resolver 310 may be configured to initiate a DNS lookup call for one or more sub-resource uniform resource locator (URL) hostnames associated with a referring URL prior to navigation to a referring URL. As a result, a resolution result for at least one of the one or more sub-resource URL hostnames may be cached in the DNS cache in preparation for the navigation to the one or more sub-resource URLs. A navigation may include, but is not limited to, a user clicking on a link, or pressing "Enter" or "Return" upon entering or selecting a URL address. A navigation may be any action or gesture by a user confirming or committing to a URL address or hostname. DNS pre-resolver 310 may also be configured to initiate a DNS lookup call for one or more sub-resource URL hostnames associated with a referring URL in concert with navigation to the referring URL. According to another embodiment, a resolution result for at least one of the one or more sub-resource URL hostnames may be cached in the DNS cache in preparation for the acquisition of content from the one or more sub-resource URLs. According to another embodiment, DNS pre-fetcher 220 may be configured to discard an IP address for at least one of the hostnames or sub-resources prior to navigation.

According to an embodiment, DNS pre-resolver may provide one or more hostnames or sub-resources to DNS pre-fetcher 220. According to some implementations, DNS pre-resolver 310 may learn sub-resources of a referring URL or referring hostname for DNS pre-resolution.

Adaptive DNS Pre-Resolution

Adaptive DNS pre-resolution may include learning sub-resources of referring URLS or referring hostnames, according to a feature of the invention. According to an embodiment, navigation monitor 312 may be configured to identify one or more URL sub-resources referred to by a referring URL. The hostnames or domains of the identified sub-resources may be recorded. The referring URL, referring hostname, or the referring hostname plus path, or other subsets of the referring URL may also be recorded.

Navigation monitor 312 may be configured to record the relationship between the referring URL or a subset of the referring URL and its associated sub-resource URLs, according to an embodiment. This relationship information may assist adaptive DNS pre-resolution. In some cases, a relationship may include multiple sub-resource URLs per referring URL. In other cases, a relationship may be a correspondence of one referring URL to one sub-resource URL. Relationship information may include one or more relationships or sets of relationships. According to an embodiment, relationship information may be persistent, or more permanently recorded.

According to another embodiment, relationship information may be temporarily recorded. According to some embodiments, temporary recordation may include, but is not limited to, being discarded in whole or in part after a period of time, after an amount of activity, or after a specified activity or threshold is reached. Activities may include, for example, the activity of terminating a browser. A threshold may include, for example, having more than a specified number of stored relationships, or more than a specified number of relationships with a given referring URL hostname.

In some cases, sub-resources may be identified upon or after navigation to the referring URL. In an embodiment, navigation monitor 312 may be configured to detect relationship information based upon one or more sub-resource URLs loaded as a consequence of obtaining content of a referring URL. In a further embodiment, navigation monitor 312 may be configured to determine the consequence based upon an HTTP referrer field found in a header of a request of the one or more sub-resource URLs. In other cases, sub-resources may be learned or identified before a navigation to the referring URL.

Relationship information may be stored in browser 210, DNS pre-resolver 310 or relationship data store 314. According to an embodiment, relationship data store 314 may be a storage device configured to store relationship information. Other relationship information may include, but is not limited to, which sub-resources have been identified or pre-resolved or cache eviction times for hostnames and sub-resources. Relationship data store 314 may or may not store relationship information persistently.

Relationship data store 314 may be or may include a data structure in a memory accessed by a processor, according to an embodiment. This data structure may record relationships in a hash map, according to a further embodiment. The hash map may provide a list of domain names for a given URL, or hostname, or hostname plus path. In some embodiments, relationship data store 314 may be consulted for matches whenever a user navigates to a target URL. Data structure matches may include, for example, a match of the hostname of a target URL with a hostname that is a key to a hash map. In some embodiments, one or more of an identified list of domains, or sub-resource domains, selected from a data structure may be pre-resolved when a user navigates to such a target URL.

According to an embodiment, identified sub-resources and relationships may be used for pre-caching a sub-resource's domain or hostname. This pre-caching can be performed in advance of another navigation to the sub-resource. Pre-caching can also be performed for a sub-resource navigation at a later time, which may be beyond a cache eviction time.

Other information may be obtained for adaptive DNS pre-resolution.

Navigation monitor 312 may be configured to collect and evaluate latency statistics and patterns, according to an embodiment. Statistics or patterns may be associated with particular domains, hostnames, sub-resources, sub-resource types, or relationships. Such statistics and patterns may lead to sub-resource and relationship valuations. Such information may also provide for more advanced adaptive learning of sub-resources so that DNS pre-resolution of sub-resources may be more efficient.

DNS pre-resolution learning may involve receiving relationship information, according to an embodiment. DNS pre-resolver 310 may be configured to receive relationship information. According to an embodiment, navigation monitor 312 or relationship data store 314 may be configured to receive relationship information. Relationship information may be received from a web page, according to a further embodiment. Such a web page may be a search page. A search page may have relationship information on the page. Relationship information may be relayed as text on the search page. In another embodiment, relationship information may be an embedded element on the page. In some cases, a result on such a search page may be a link to a server that provides relationship information. In some cases, relationship information may be obtained or received from persistent information stored locally.

Relationship information may be received from another server, according to an embodiment. A sending server may be a third party server. Relationship information may also be received in a stream, according to a feature. According to another feature, relationship information may be received in a container of information. According to an embodiment, relationship information may be received as data or code. In some cases, relationship information may be embedded in a scripting language. In other cases, relationship information may be received as Extensible Markup Language (XML). Relationship information may be received in yet other forms of embedded data or embedded code.

Relationship information may be received from a centralized server, according to an embodiment. The information may be acquired from a centralized server as part of a response to a request. Relationship information may be proactively provided by a centralized server. In some embodiments, proactive provision may include providing a list of sub-resources for universally popular domains. Domains that have a higher likelihood of being of interest to a user may be provided. According to some embodiments, a likelihood of being of interest to a given user may be based on a user's preferences, such as a preferred language or preferred locality. A likelihood of interest may also be based on preferred domain contents as expressed by a user's browsing history.

According to an embodiment, DNS pre-resolver 310 may be configured to receive sub-resources or relationship information for one or more predicted hostnames based upon entering activity in a URL address bar prior to a user completely entering a hostname. Entering activity may include a user typing a URL address in the address bar. Entering activity may also include plausible hostnames that are predicted or proposed to a user based on autocompletion logic, while the user is typing. Autocompletion proposals may be based on previously entered URLs, query submissions, or immediate termination of typing by the user (completion of explicit user URL entry). Each proposed hostname may be processed and resolved before a user finalizes his or her entry, whether or not a user ultimately agrees with a self-completing prediction. According to another embodiment, sub-resources can be identified for proposed hostnames for DNS pre-resolution. In an embodiment, a server may provide sub-resources of a proposed hostname for DNS pre-resolution to DNS pre-resolver 310. A server may also provide sub-resources of a proposed hostname to navigation monitor 312 or relationship data store 314.

Relationship data store 314 may be configured to receive relationship information, according to an embodiment. Relationship information may be received from navigation monitor 312. Relationship information may also be received from another server. Sub-resources for DNS pre-resolution may be determined from relationship information and provided to DNS pre-resolver 310. According to an embodiment, relationship data store 314 may be further configured to purge sub-resource or relationship information. In some cases, hostnames that have not had a DNS lookup call within a determined cache eviction time may be purged.

According to a feature, learning may involve prioritizing or removing sub-resources or relationships from DNS pre-resolution consideration. In an embodiment, relationship data store 314 or DNS pre-resolver 310 may be configured to sort or organize sub-resources or relationships according to a valuation or other metric of usefulness. Relationships may receive valuations. It is also possible, for sub-resources within a relationship to receive separate evaluations. In some cases, valuations may correspond to a latency saving, or a reduced latency time between a request and the rendering of the requested web page. A latency saving may be recorded as an amount of time saved by pre-resolution. DNS pre-resolver 310 may cause relationship data store 314 to purge relationship information based upon a valuation, predetermined limit, duplicates, request frequency, duration of existence in the data store, a trigger, or any combination of factors. For example, one relationship may include sub-resources that provide a large latency saving. However, the information may have existed in relationship data store 314 for a long period of time. The duration of DNS pre-resolution may be larger than a specified amount of time. A second relationship may be relatively recent in relationship data store 314 but have a lower valuation. If relationship data store 314 has reached a determined number of entries, possibly requiring a purge of selected information, the valuation of the first set of relationship information may cause the first set to remain while the second, fresher set is purged. However, if the second relationship has a high request frequency, it may possibly be chosen over the first relationship. Such an example is for purposes of illustration. Other determinations or combinations of values may provide for the purge or lack of consideration of one set of relationships or sub-resources in a relationship over another.

Other examples of pruning relationship information are provided for illustrative purposes. In one example, a set of sub-resources may consist of links to hostnames that are already DNS pre-resolved as other than sub-resources. For example, sub-resources or relationships for which the browser has identified explicit embedded links to them, such as links of the form "<a href=http://other_domain . . . >", may be removed from DNS sub-resource pre-resolution consideration. Such a technique may enhance the learning process by avoiding false positive inclusions of linked pages as sub-resources. False positive examples may include links that are directly selected by a user, rather than being representative of sub-resources. In another example, a referring URL or referring hostname may include a number of sub-resources that are later identified for DNS pre-resolution in other contexts. Such sub-resources or relationships may be purged as well. In an additional case, a hostname may be considered to have too many sub-resources for DNS pre-resolution. In such a case, the sub-resource of the hostname having a lower valuation will be removed from consideration while higher valued sub-resources would remain in the relationship. In another aspect, whole relationships may also be removed based on valuations of the sub-resources. Such removals may be based on a lack of accrued valuation over time.

Some relationships or sets of relationship information may have high valuations or have sub-resources that are tagged with particularly high valuations. According to an embodiment, a confidence threshold may be defined, in which connections to sub-resources of relationships with high valuations meeting or exceeding a confidence threshold may be opened. In some embodiments, opening a connection may include performing initial activities for establishing a connection, such as in TCP/IP, exchanging a SYN, ACK, and SYN-ACK message. Such connections may be opened in response to a navigation to a referring URL or referring hostname associated with the sub-resources.

Figure 4:
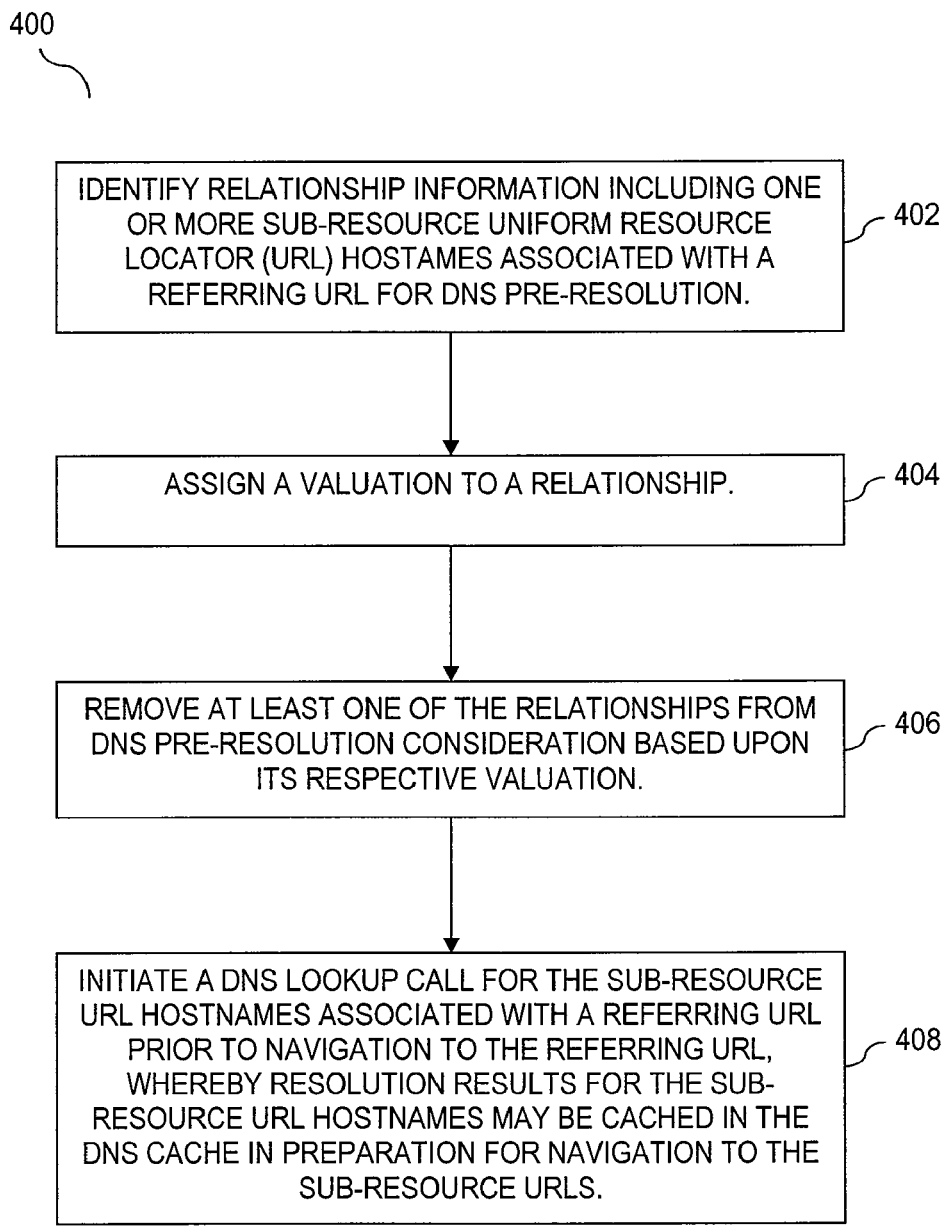
FIG. 4 is a flowchart illustrating a method for DNS pre-resolution, according to an embodiment of the present invention.

FIG. 4 illustrates an exemplary method 400 for DNS pre-resolution, according to an embodiment. The steps in this exemplary method are provided to illustrate a possible sequence of steps. Some steps in this embodiment may be performed in a different sequence or not at all. In step 402, sub-resource URLs associated with a referring URL are identified for DNS pre-resolution. Steps 402-406 are part of an adaptive or learning process for learning sub-resources for a referring URL. In step 408, a DNS lookup call is initiated for at least one of the sub-resource URL hostnames associated with the referring URL prior to navigation to the referring URL and/or sub-resource URL. As a result, resolution results for the sub-resource URL hostnames are cached in the DNS cache in preparation for navigation to the sub-resources.

According to some embodiments, adaptive DNS pre-resolution may involve removing some relationships or sub-resources of a relationship from DNS pre-resolution consideration based upon circumstances similar to those described above. Relationships may be tagged with valuations. In step 404, a valuation may be assigned. This valuation may be based upon a number of identified sub-resource URLs associated with a referring URL. Such valuations may sort, promote or demote sub-resources from DNS pre-resolution in order to limit the number of false positives or unnecessary DNS lookup calls. Prioritization may involve metrics such as a quotient of latency reduction or saving per unit time.

In step 406, relationships, sub-resources or hostnames may be removed from DNS pre-resolution consideration based upon their respective valuations. In many cases, removal may be based upon a low valuation and/or a time duration. In some embodiments, valuations may determine which sub-resources are provided to DNS pre-resolver 310 for DNS pre-resolution. Valuations may also determine which sub-resources DNS pre-resolver 310 provides to DNS pre-fetcher 220. According to an embodiment, steps 402-408 may be performed by browser 210. According to another embodiment, steps 402-406 may be performed by navigation monitor 312. Steps 402-408 may be performed by DNS pre-resolver 310.

Figure 5:
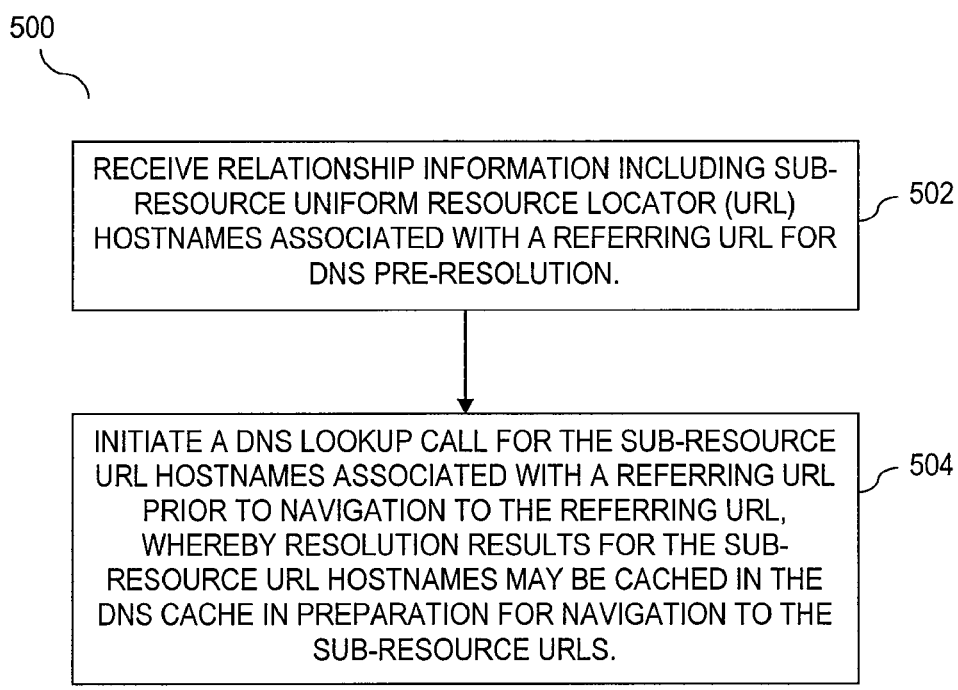
FIG. 5 is a flowchart illustrating another method for DNS pre-resolution, according to an embodiment of the present invention.

FIG. 5 illustrates an exemplary method 500 for DNS pre-resolution, according to an embodiment. While exemplary method 400 involves identifying and evaluating relationship information, exemplary method 500 involves receiving relationship information. In step 502, relationship information including sub-resource URLs associated with a referring URL is received for DNS pre-resolution. Step 502 is part of an adaptive or learning process for learning sub-resources for hostnames. In some cases, received sub-resources or relationships can be pruned or filtered based on usefulness. This pruning may take place before or after the relationship information is received.

In step 504, a DNS lookup call is initiated for at least one of the sub-resource hostnames associated with the referring URL prior to navigation to the referring URL. As a result, resolution results for the sub-resource hostnames may be cached in the DNS cache in preparation for navigation to the sub-resources. According to an embodiment, step 502 and 504 may be performed by browser 210. According to another embodiment, step 502 may be performed by navigation monitor 312, relationship data store 314, or DNS pre-resolver 310. Step 504 may be performed by DNS pre-resolver 310.

Aspects of the present invention, for exemplary system 200, system 300, method 400 and/or method 500 or any part(s) or function(s) thereof may be implemented using hardware, software modules, firmware, tangible computer readable or computer usable storage media having instructions stored thereon, or a combination thereof and may be implemented in one or more computer systems or other processing systems.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

The invention claimed is:

1. A method for domain name system (DNS) pre-resolution in a processor executing a browser that utilizes a DNS to resolve network addresses comprising:
    storing, by the browser, relationship information including one or more relationships, each relationship including one or more sub-resource uniform resource locators (URLs) in association with a referring URL, wherein each of the sub-resource URLs is determined by the browser based on content received upon a first navigation to the referring URL by the browser;
    initiating, by the browser, and using the stored relationship information, a DNS lookup call for resolving one or more hostnames of the sub-resource URLs associated with the referring URL, the DNS lookup call being initiated by the browser prior to a second navigation by the browser to the referring URL, whereby a resolution result including a resolved internet protocol (IP) address for at least one of the one or more sub-resource URLs hostnames is cached in a DNS cache in preparation for the second navigation to the referring URL by the browser; and
    initiating the second navigation to the referring URL and utilizing the resolution result cached in the DNS cache to resolve at least one of the one or more sub-resource URLs hostnames.

2. The method of claim 1, further comprising, prior to storing the relationship information, identifying the relationship information including the one or more sub-resource URLs associated with the referring URL for DNS pre-resolution.

3. The method of claim 2, wherein the identifying comprises detecting the relationship information based upon the one or more sub-resource URLs being loaded into the browser as a consequence of obtaining the content of the referring URL, and the method further comprising determining the consequence based upon an HTTP referrer field found in a header of a request of the one or more sub-resource URLs.

4. The method of claim 1, further comprising receiving the relationship information in the browser, each relationship including the one or more sub-resource URLs associated with the referring URL for DNS pre-resolution.

5. The method of claim 4, wherein the relationship information is received from a server.

6. The method of claim 4, wherein the relationship information is determined from auto-completion suggestions for the referring URL.

7. The method of claim 4, wherein the relationship information is received in a search page.

8. The method of claim 4, wherein the relationship information is received in at least one of XML or an embedded script.

9. The method of claim 1, further comprising removing from DNS pre-resolution a sub-resource URL having an explicit embedded URL link from a second referring URL, wherein a DNS lookup call is not performed for the removed sub-resource URL.

10. The method of claim 1, further comprising removing at least one relationship from the one or more relationships when the at least one relationship is stored within the browser for longer than a threshold time period.

11. A method for domain name system (DNS) pre-resolution in a processor executing a browser that utilizes a DNS to resolve network addresses comprising:
storing, at the browser, relationship information including one or more relationships, each relationship including one or more sub-resource uniform resource locators (URLs) in associations with a referring URL, wherein each of the one or more sub-resource URLs is determined by the browser based on content received from a first navigation to the referring URL;
initiating, by the browser, and using the stored relationship information, a DNS lookup call for resolving at least one hostname of the one or more sub-resource URLs associated with the referring URL simultaneously with navigation to the referring URL;
caching a resolution result that includes a resolved internet protocol (IP) address for the at least one of the one or more sub-resource URLs hostnames in a DNS cache in preparation for navigation to the one or more sub-resource URLs; and
initiating a second navigation to the referring URL and utilizing the resolution result cached in the DNS cache to resolve at least one of the one or more sub-resource URLs hostnames.

12. The method of claim 11, further comprising, prior to storing the relationship information, detecting the relationship information based upon one or more sub-resource URLs being loaded into the browser as a consequence of the browser obtaining the content of the referring URL.

13. The method of claim 11, wherein the relationship information is determined from auto-completion suggestions for the referring URL.

14. The method of claim 11, further comprising opening a connection to at least one of the one or more sub-resource URLs hostnames based upon a relationship valuation.

15. The method of claim 11, wherein the relationship information is determined from domain contents as expressed by the browser's history.

16. A system for domain name system (DNS) pre-resolution with a browser that utilizes a DNS to resolve network addresses comprising:
memory, coupled to one or more processors, storing executable instructions for a browser; and
the one or more processors coupled to the memory, the one or more processors being configured to:
store, in the memory, relationship information including one or more relationships, each relationship including one or more sub-resource uniform resource locators (URLs) in association with a referring URL, wherein each sub-resource URL includes a hostname, the sub-resource URLs being determined by the browser based on content received upon a first navigation to the referring URL; and
initiate a DNS lookup call for resolving at least one of the hostnames of the one or more sub-resource URLs associated with a referring URL, based on the stored relationship information, simultaneously with navigation to the referring URL, whereby a DNS resolution result including a resolved internet protocol (IP) address for the at least one of the hostnames of the one or more sub-resource URLs is cached in a DNS cache in preparation for navigation to the one or more sub-resource URLs;
wherein the one or more processors are further configured to perform a second navigation to the referring URL and the resolution result cached in the DNS cache is used to resolve at least one of the one or more sub-resource URLs hostnames.

17. The system of claim 16, wherein the one or more processors are further configured to detect the relationship information based upon the one or more sub-resource URLs being loaded into the browser as a consequence of obtaining the content of the referring URL.

18. The system of claim 16, wherein the referring URL is based on a predicted hostname, wherein the predicted hostname is determined based on previously visited URLs.

19. The system of claim 16, wherein each of the one or more sub-resource URLs includes a hostname referencing a different web site.

20. The system of claim 16, wherein the one or more processors are further configured to identify the relationship information including the one or more sub-resource URLs associated with the referring URL for DNS pre-resolution.

* * * * *